June 13, 1961 R. M. CARSON 2,988,383
TURNTABLE-TYPE HITCH
Filed March 18, 1960 2 Sheets-Sheet 1
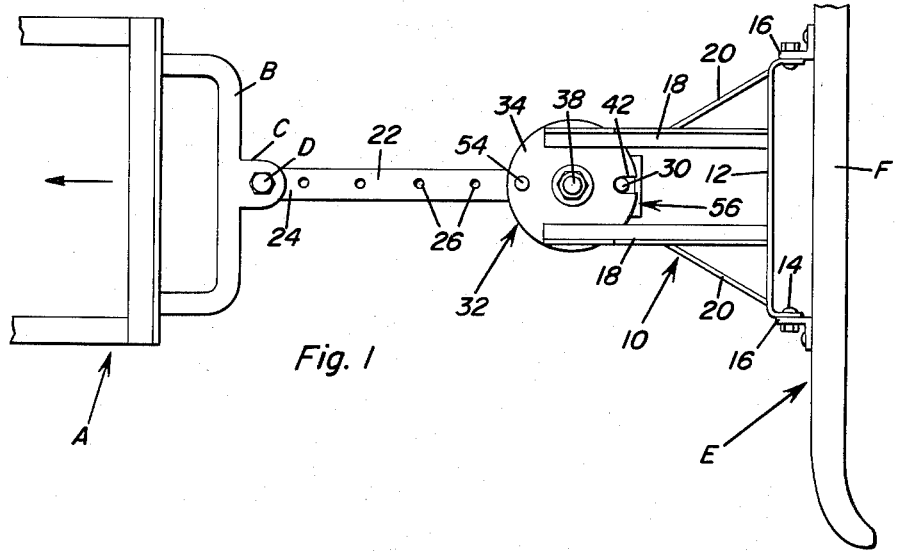
Fig. 1
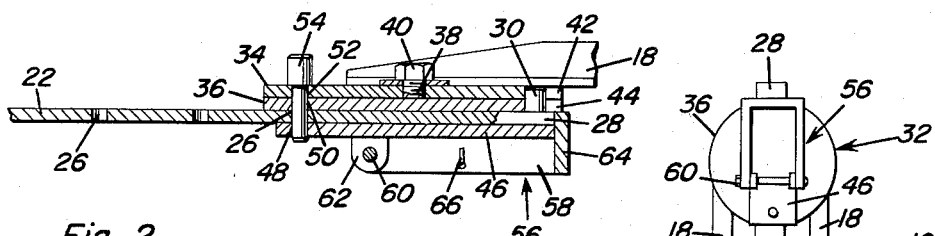
Fig. 2
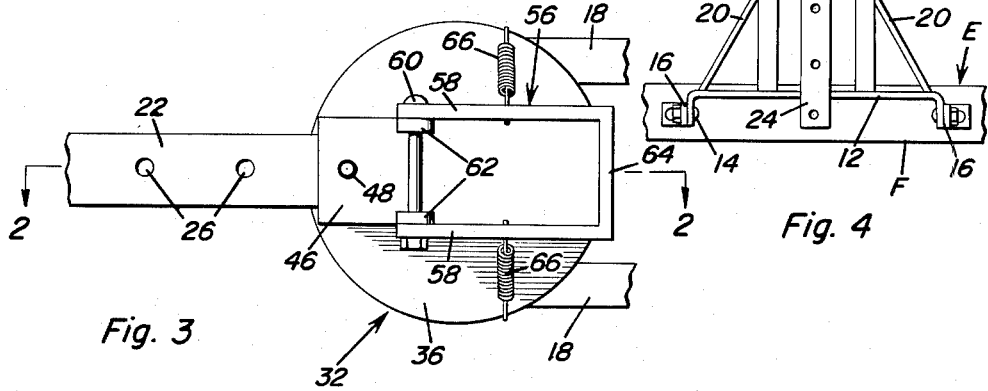
Fig. 3
Fig. 4
Raymond M. Carson
INVENTOR.
BY *Clarence A. O'Brien*
*and Harvey B. Jacobson*
Attorneys June 13, 1961   R. M. CARSON   2,988,383
TURNTABLE-TYPE HITCH Filed March 18, 1960   2 Sheets-Sheet 2

Raymond M. Carson
INVENTOR.

BY Clarence A. O'Brien
and Harvey B. Jacobson
Attorneys

United States Patent Office 2,988,383
Patented June 13, 1961

2,988,383
TURNTABLE-TYPE HITCH
Raymond M. Carson, Rte. 1, Faxon, Okla.
Filed Mar. 18, 1960, Ser. No. 15,933
9 Claims. (Cl. 280—478)

The present invention relates to towing bars and draft connections for vehicles, generally speaking, but relates more particularly, to a self-adapting and self-aligning hitch through the medium of which a rigid towing device which is hingedly mounted on the front end of a drawn vehicle is joined by improved wide-range coupling means to a projectible and retractible push-pull towing tongue having means at its forward end adapted to be separably and operatively connected with a pulling vehicle.

A general objective of the invention is to structurally, functionally and otherwise improve upon prior art draft tongue hitches, many of which have been patented. More particularly, the present invention has to do with a novel turntable-type coupling between the rigid towing device and push-pull tongue and which is broadly analogous to a similar adaptation disclosed and claimed in prior Patent No. 2,918,310.

In carrying out the principles of the instant invention a self-adapting wide-range automatic coupling means provides a reliable operating connection between the coupling means and tongue. Briefly, this means comprises a simple turntable similar to a fifth-wheel. It embodies top and bottom plates one above the other which are swivelly joined at their respective central portions. The turntable is, of course, fixedly mounted on the towing device and the towing device is preferably hingedly joined to the front end of the drawn vehicle. The tongue has a substantial portion thereof overlying and slidably mounted on the bottom one of the plates. This tongue has a movement limiting stop which is engageable with predetermined portions of the turntable when the tongue is slid forwardly and through the medium of which the pulling and towing forces of the over-all hitch are attained. A normally released automatically engageable spring-biased and retained latch is operatively mounted on the bottom plate of the turntable and is cooperable, preferably with the rear end of the tongue, in a manner to prevent the tongue from sliding rearwardly once the coupling result has been attained. The tongue serves to keep the latch initially in a released position and, when the tongue is slid forwardly relative to the plates, it serves to trip the latch whereupon the latch engages and prevents rearward sliding movement of the tongue until the latch is intentionally released by hand.

The turntable is supported on a frame which is hingedly mounted on the front end of the drawn vehicle. More specifically, the plates are circular and of the same diameter and the top plate is fixed to the frame and the bottom plate is swivelly mounted on the top plate and both plates have rearwardly registrable keeper notches, said notches being adapted to receive an upstanding keeper lug on the rearward end of the sliding tongue.

Novelty is also predicated upon the adoption and use of a substantially U-shaped yoke as the latch. This is hingedly mounted on the bottom plate and the bight portion thereof constitutes a retaining saddle or stirrup and is engageable with the rear lug-equipped end of the tongue at the moment the lug is seated in the keeper notches, whereupon retrograde movement of the tongue is prevented.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view showing fragmentary portions of the pulling or towing vehicle, the drawn vehicle and showing the towing device or frame provided at its forward end with the wide-range turntable hitch and associated tongue;

FIG. 2 is a view in section with parts in elevation illustrating the details of the automatic turntable-type coupling, showing the latch closed and the tongue locked or latched in position;

FIG. 3 is a bottom plan view of the structure seen in FIG. 2;

FIG. 4 is a front elevational view of the drawn vehicle on a smaller scale showing how the towing device or frame may be swung up to a vertical out-of-the-way position when not in use;

Figure 5:
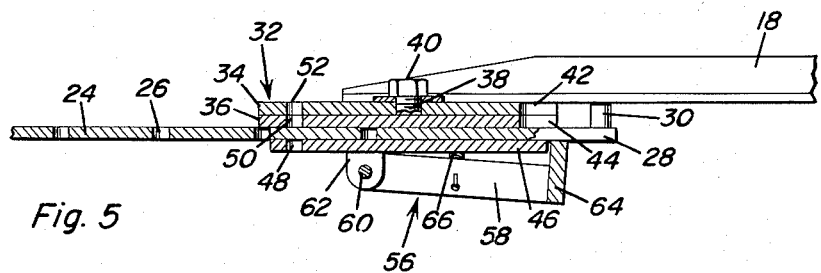
FIG. 5 is a view in section and elevation, similar to FIG. 2 but showing the latch and tongue released, the section being on the line 5—5 of FIG. 6.

Referring first to FIG. 1 the pulling or towing vehicle is generally designated at A, the rear end being provided with a frame or the like B, and a lug C with an attaching bolt or similar fastener D. The drawn or towed vehicle is denoted at E, the forward end being designated broadly at F.

The towing device comprises generally a frame 10 embodying a U-shaped member 12 having lateral ends hingedly mounted at 14 on attaching brackets 16. The spaced parallel towing bars are in the form of angle irons 18 fixed to the member 12 and rigidified by diagonal braces 20. This frame may be swung down to the horizontal draft position shown or it may be swung up to a vertical out-of-the-way position depicted in FIG. 4. In other words, when the towing device 10 is not in use it may be swung up in front of the vehicle E and fastened in any suitable manner (not shown). The push-pull tongue, a rigid straight bar, is denoted at 22 and the forward end 24 is suitably joined to the aforementioned lug C. This tongue is of appropriate length and is provided with longitudinally spaced holes 26. It is also provided at the rear end 28 with a limiting stop. Specifically, this comprises an upstanding keeper lug 30.

The turntable-type "fifth-wheel" is denoted generally by the numeral 32. It comprises a top plate or disk 34 which spans and is rigidly fastened to the forward ends of the angle irons 18, and a companion bottom disk or plate 36 of a corresponding diameter. The disk 36 has an assembling and pivoting stud 38 at the center extending up through a hole in the top disk or plate and secured by a nut or the like 40. Thus, the plates are swivelly connected. The central rear edge or margin of the plate 36 has a keeper notch 42 with which a relatively movable keeper notch 44 is registerable when the coupling is effected as seen in FIG. 2. These keeper notches serve to accommodate or seat the keeper lug 30. This arrangement obviously limits the forward sliding movement of the tongue relative to the coupling means. An open-ended sleeve or socket member 46 is fixed on the central bottom portion of the bottom plate and the tongue is slidingly mounted therein. The sleeve is preferably of a length approximately commensurate with the diameter of the plates or disks 34 and 36. It is provided at the forward end with a hole 48 registerable with complemental holes 50 and 52 in the plates. These several holes serve to accommodate the manually insertable and removable safety locking pin 54. The pin also passes through a selected one of the holes 26 in the tongue, all as illustrated in FIG. 2.

The improved latch means, specifically speaking, comprises a U-shaped yoke 56 having spaced parallel arms 58 hinged at 60 on attaching and retaining lugs 62 carried by and depending at right angles from the bottom of the sleeve. The length of the yoke is such that the bight portion 64 is allowed to move in a limited arcuate path toward and from the notches or keeper seats 42 and 44. This yoke or latch is spring-biased by suitable coil springs 66 connected to the arms and also anchored on the edge portions of the bottom plate 36.

Figure 6:
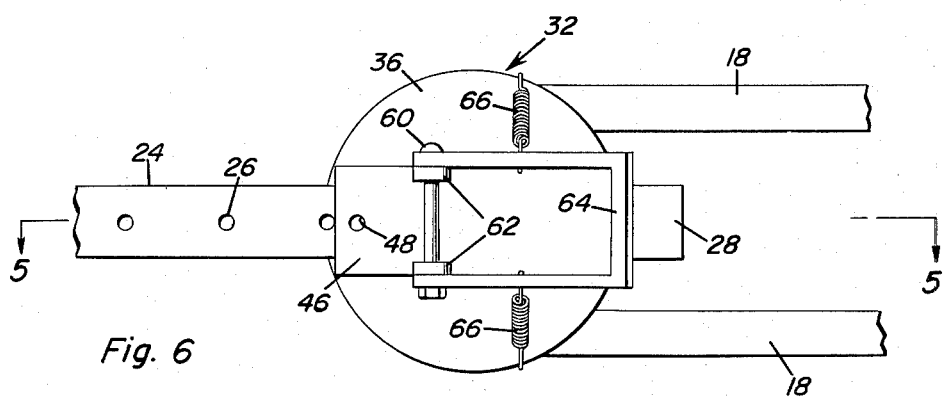
FIG. 6 is a bottom plan view of the structure depicted in FIG. 5.
Figure 7:
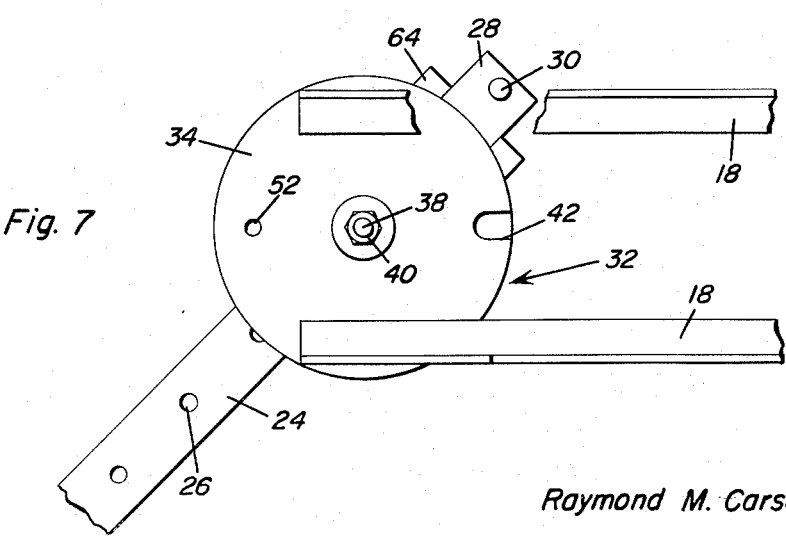
FIG. 7 is a top plan view with portions broken away and which serves to show the wide-range angling action of the push-pull tongue.

It follows that the improvements have to do primarily with a simple and reliable fifth-wheel type turntable comprising disk-like plates or disks fixed for operation on the forward end of the hinged frame of the towing device, a sleeve or the like carried by the bottom disk and the push-pull tongue slidingly mounted therein in the manner shown. It follows that the vehicle A may be driven reasonably close to the vehicle E but not necessarily accurately lined up. Then the tongue 22 is connected in the manner shown in FIG. 1. Actually the tongue may be in any one of a number of angular positions as shown in FIG. 7. When the vehicle A "takes off" the swivelling action of the plates allows the tongue to pull around to a direct forward position in proper alignment whereupon the limit stop lug 30 engages in the keeper seats 42 and 44. The latch is, of course, held in a released position by the tongue as shown in the unlatched position in FIGS. 5 and 6, but when the tongue slides forwardly the latch is tripped and takes the position shown in FIGS. 2 and 3, thus causing the bight portion 64 to engage the rear end portion 28 of the tongue and preventing rearward sliding movement of the tongue.

Although it may be self-evident, it is nevertheless desirable to point out here that the invention may be used on the pulling or towing vehicle as well as the pulled or towed vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use between separably connectible ends of a towing or pulling vehicle and a drawn vehicle; a self-aligning hitch wherein the forward movement of the pulling vehicle automatically effectuates a desired draft connection between said vehicle, said hitch comprising: a towing device having means at a rearward end thereof which may be operatively joined to a front end of said drawn vehicle, a rigid push-pull tongue having means at a forward end thereof which is adapted to be separably and operatively connected to the rear end of said pulling vehicle, and self-adapting wide-range coupling means between said push-pull tongue and said towing device, said coupling means comprising a fifth-wheel type turntable embodying top and bottom plates one above the other swivelly joined at their respective central portions, said turntable being fixed on said towing device, said tongue having a substantial portion thereof overlapping and slidingly mounted on one of said plates, said tongue having a movement limiting stop which is engageable with the turnable table and through the medium of which the pulling and towing forces of the over-all hitch are attained, and a normally released and automatically engageable spring-biased and retained latch operatively mounted on said one plate and cooperable with said tongue and by way of which said stop maintains the plates against relative rotation, said tongue serving to keep the latch initially in a released position and, when slid forwardly relative to the plates, serving to trip the latch whereupon the latch engages and prevents rearward sliding of the tongue until intentionally released by hand, said first-mentioned means comprising a mounting frame to which the other of said plates is rigidly secured.

2. The structure defined in claim 1, and wherein said one plate is provided with a fixed open ended sleeve, said tongue being slidably mounted in said sleeve, said tongue having longitudinally spaced pin holes registerable with alignable holes in said plates, and a manually insertable and removable safety-pin removably mounted in said holes, whereby to assist in effecting a reliable positive mechanical connection between the two plates and tongue when the latter is in its final pulling and towing position.

3. For use between separably connectible ends of a towing or pulling vehicle and a drawn vehicle; a self-aligning hitch wherein the forward movement of the pulling vehicle automatically effectuates a desired draft connection between said vehicle, said hitch comprising: a towing device having means at a rearward end thereof which may be operatively joined to a front end of said drawn vehicle, a rigid push-pull tongue having means at a forward end thereof which is adapted to be separably and operatively connected to the rear end of said pulling vehicle, and self-adapting wide-range coupling means between said push-pull tongue and said towing device, said coupling means comprising a fifth-wheel type turntable embodying top and bottom plates one above the other swivelly joined at their respective central portions, said turntable being fixed on said towing device, said tongue having a substantial portion thereof overlapping and slidingly mounted on one of said plates, said tongue having a movement limiting stop which is engageable with the turnable table and through the medium of which the pulling and towing forces of the overall hitch are attained, and a normally released and automatically engageable spring-biased and retained latch operatively mounted on said one plate and cooperable with said tongue and by way of which said stop maintains the plates against relative rotation, said tongue serving to keep the latch initially in a released position and, when slid forwardly relative to the plates, serving to trip the latch whereupon the latch engages and prevents rearward sliding of the tongue until intentionally released by hand, said first-mentioned means comprising a mounting frame to which the other of said plates is rigidly secured, said limiting stop comprising an upstanding keeper lug fixed on the top of the tongue and seatable in registerable radially and outwardly opening keeper notches provided therefor in rearward marginal edge portions of said plates.

4. For use between separably connectible ends of a towing or pulling vehicle and a drawn vehicle; a self-aligning hitch wherein the forward movement of the pulling vehicle automatically effectuates a desired draft connection between said vehicle, said hitch comprising: a towing device having means at a rearward end thereof which may be operatively joined to a front end of said drawn vehicle, a rigid push-pull tongue having means at a forward end thereof which is adapted to be separably and operatively connected to the rear end of said pulling vehicle, and self-adapting wide-range coupling means between said push-pull tongue and said towing device, said coupling means comprising a fifth-wheel type turntable embodying top and bottom plates one above the other swivelly joined at their respective central portions, said turntable being fixed on said towing vehicle, said tongue having a substantial portion thereof overlapping and slidingly mounted on one of said plates, said tongue having a movement limiting stop which is engageable with the turnable table and through the medium of which the pulling and towing forces of the over-all hitch are attained, and a normally released and automatically engageable spring-biased and retained latch operatively mounted on said one plate and cooperable with said tongue and by way of which said stop maintains the plates against relative rotation, said tongue serving to keep the latch initially in a released position and, when slid forwardly relative to the plates, serving to trip the latch whereupon the latch engages and prevents rearward sliding of the tongue until intentionally released by hand, said first-mentioned means comprising a mounting frame to which the other of said plates is rigidly secured, said plates being circular in plan and of the same diameter, marginal edge portions of said plates having registerable notches providing keeper seats, said limiting stop comprising a rigid upstanding keeper lug fixed atop the tongue and removably fitting into said seats.

5. For use between separably connectible ends of a towing or pulling vehicle and a drawn vehicle; a self-aligning hitch wherein the forward movement of the pulling vehicle automatically effectuates a desired draft connection between said vehicle, said hitch comprising; a towing device having means at a rearward end thereof which may be operatively joined to a front end of said drawn vehicle, a rigid push-pull tongue having means at a forward end thereof which is adapted to be separably and operatively connected to the rear end of said pulling vehicle, and self-adapting wide-range coupling means between said push-pull tongue and said towing device, said coupling means comprising a fifth-wheel type turntable embodying top and bottom plates one above the other swively joined at their respective central portions, said turntable being fixed on said towing device, said tongue having a substantial portion thereof overlapping and slidingly mounted on one of said plates, said tongue having a movement limiting stop which is engageable with the turnable table and through the medium of which the pulling and towing forces of the over-all hitch are attained, and a normally released and automatically engageable spring-biased and retained latch operatively mounted on said one plate and cooperable with said tongue and by way of which said stop maintains the plates against relative rotation, said tongue serving to keep the latch initially in a released position and, when slid forwardly relative to the plates, serving to trip the latch whereupon the latch engages and prevents rearward sliding of the tongue until intentionally released by hand, said first-mentioned means comprising a mounting frame to which the other of said plates is rigidly secured, said latch comprising a U-shaped yoke the arms of which are hingedly mounted on said one plate, the bight portion being swingable in an arcuate path toward and from adjacent marginal edge portions of the plate and being releasably engageable with a rear end of said tongue and thus providing a stirrup for said tongue so that retrograde movement of the tongue is prevented until the stirrup is intentionally released by hand.

6. In combination, a rigid frame the rear end of which is adapted to be hingedly mounted on the front end of a drawn vehicle, a turntable operatively mounted on the leading end of said frame and embodying a top plate fixed to the frame and a complemental bottom plate swively mounted beneath the top plate, said bottom plate being provided on its underneath side with an open-ended sleeve, a tongue having a major portion thereof slidingly mounted in said sleeve, a spring-biased latch pivotally mounted on and beneath the bottom plate and normally held in a tongue-releasing position by direct contact with the tongue, and being released by the forward sliding movement of the tongue in order to engage the tongue to prevent retrograde sliding movement of the tongue.

7. In combination, a rigid frame the rear end of which is adapted to be hingedly mounted on the front end of a drawn vehicle, a turntable operatively mounted on the leading end of said frame and embodying a top plate fixed to the frame and a complemental bottom plate swively mounted beneath the top plate, said bottom plate being provided on its underneath side with an open-ended sleeve, a tongue having a major portion thereof slidingly mounted in the sleeve, a spring-biased latch pivotally mounted on and beneath the bottom plate and normally held in a tongue-releasing position by direct contact with the tongue, and being released by the forward sliding movement of the tongue in order to engage the tongue to prevent retrograde sliding movement of the tongue, said plates being provided with registerable keeper notches, said tongue being provided with a keeper lug releasably seated in said notches.

8. In combination, a rigid frame the rear end of which is adapted to be hingedly mounted on the front end of a drawn vehicle, a turntable operatively mounted on the leading end of said frame and embodying a top plate fixed to the frame and a complemental bottom plate swively mounted beneath the top plate, said bottom plate being provided on its underneath side with an open-ended sleeve, a tongue having a major portion thereof slidingly mounted in the sleeve, a spring-biased latch pivotally mounted on and beneath the bottom plate and normally held in a tongue releasing position by direct contact with the tongue, and being released by the forward sliding movement of the tongue in order to engage the tongue to prevent retrograde sliding movement of the tongue, said plates being provided with registerable keeper notches, said tongue being provided with a keeper lug releasably seated in said notches, said plates, tongue and sleeve having aligned holes, said holes adapted to receive an insertable and removable safety locking pin.

9. In combination, a rigid frame the rear end of which is adapted to be hingedly mounted on the front end of a drawn vehicle, a turntable operatively mounted on the leading end of said frame and embodying a top plate fixed to the frame and a complemental bottom plate swively mounted beneath the top plate, said bottom plate being provided on its underneath side with an open-ended sleeve, a tongue having a major portion thereof slidingly mounted in the sleeve, a spring-biased latch pivotally mounted on and beneath the bottom plate and normally held in a tongue-releasing position by direct contact with the tongue, and being released by the forward sliding movement of the tongue in order to engage the tongue to prevent retrograde sliding movement of the tongue, said plates being provided with registerable keeper notches, said tongue being provided with a keeper lug releasably seated in said notches, said latch comprising a hingedly mounted U-shaped yoke, the bight portion of said yoke being movable toward and from the keeper notches when the keeper notches are in registration with each other, said bight portion providing a stirrup-like abutment to engage an adjacent end of the tongue.

References Cited in the file of this patent

UNITED STATES PATENTS

| 1,073,650 | Wixcel | Sept. 23, 1913 |
| 1,422,189 | Eckertz | July 11, 1922 |
| 2,417,646 | Hallner | Mar. 18, 1947 |
| 2,918,310 | Carson | Dec. 22, 1959 |

FOREIGN PATENTS

| 620,176 | France | Apr. 16, 1927 |
| 388,628 | Great Britain | Mar. 2, 1933 |